United States Patent [19]

Hamilton

[11] Patent Number: 5,713,985

[45] Date of Patent: Feb. 3, 1998

[54] MULTI-FUNCTION SEPARATOR

[76] Inventor: Boyd Lynn Hamilton, P.O. Box 132100, Tyler, Tex. 75713

[21] Appl. No.: 600,348

[22] Filed: Feb. 12, 1996

[51] Int. Cl.$^6$ .................... B01D 53/04; B01D 46/24
[52] U.S. Cl. .................... 95/90; 95/143; 95/287; 96/134; 55/341.1; 55/350.1
[58] Field of Search .................... 95/90, 141, 143, 95/274, 286, 287; 96/108, 134–142; 55/341.1, 341.3, 341.7, 350.1

[56] References Cited

U.S. PATENT DOCUMENTS

| | | | |
|---|---|---|---|
| 2,701,624 | 2/1955 | Krieble | 96/136 |
| 2,735,508 | 2/1956 | Krieble | 96/136 |
| 3,186,551 | 6/1965 | Dornauf | 55/341.1 X |
| 3,252,270 | 5/1966 | Pall et al. | 95/143 |
| 3,347,026 | 10/1967 | Zankey | 96/136 |
| 3,527,027 | 9/1970 | Knight et al. | 96/134 |
| 3,732,669 | 5/1973 | Chambers | 55/341.1 X |
| 3,969,095 | 7/1976 | Kurahashi | 55/350 |
| 4,131,442 | 12/1978 | Frantz | 96/137 |
| 4,259,097 | 3/1981 | Patel et al. | 96/136 |
| 4,297,116 | 10/1981 | Cusick | 55/350.1 X |
| 4,801,313 | 1/1989 | Mann | 96/134 X |
| 4,818,257 | 4/1989 | Kennedy et al. | 95/286 |
| 4,838,903 | 6/1989 | Thomaides et al. | 95/286 |
| 5,061,300 | 10/1991 | Alexander, III | 95/287 X |
| 5,064,448 | 11/1991 | Choi | 55/38 |
| 5,092,911 | 3/1992 | Williams et al. | 96/136 X |
| 5,132,011 | 7/1992 | Ferris | 210/180 |
| 5,154,824 | 10/1992 | Anderson | 210/274 |
| 5,204,000 | 4/1993 | Steadman et al. | 210/519 |
| 5,271,245 | 12/1993 | Westermeyer | 62/470 |
| 5,318,609 | 6/1994 | Kittler | 55/443 |
| 5,354,362 | 10/1994 | Sowinski | 95/141 X |
| 5,401,404 | 3/1995 | Strauss | 210/265 |
| 5,454,937 | 10/1995 | Lewandowski | 210/104 |

FOREIGN PATENT DOCUMENTS

| | | | |
|---|---|---|---|
| 0261697 | 3/1926 | United Kingdom . | |
| 0387006 | 7/1931 | United Kingdom . | |
| 0385500 | 12/1932 | United Kingdom | 96/136 |
| 0752235 | 2/1954 | United Kingdom . | |
| 2033247 | 10/1979 | United Kingdom . | |
| 2053022 | 5/1980 | United Kingdom . | |

OTHER PUBLICATIONS

Hennessey, et al., *"Use Coalescing Methods to Solve Emulsion Problems,"* Hydrocarbon Processing 107–124 (Nov., 1995).

*Primary Examiner*—Robert Spitzer
*Attorney, Agent, or Firm*—Mark R. Wisner

[57] ABSTRACT

A multi-function separator provides a coalescing section for removal of entrained impurities in a process stream; an adsorbent section for removal of vapor contaminants; and a filter section for removal of particulate impurities. A process stream flows into longitudinal hollow centers of porous coalescer robes and radially out; through holes in a baffle; into an adsorbent section; through a redistribution baffle; into filters; and out through another redistribution baffle. The multi-function separator is designed so that the process stream flows transverse to the longitude of an elongate vessel. The fluid velocity within the coalescer section is equal throughout, so that localized high-velocity areas are avoided, thus preventing re-entrainment of a coalesced contaminant.

35 Claims, 2 Drawing Sheets

MULTI-FUNCTION SEPARATOR

BACKGROUND OF THE INVENTION

The present invention relates to the removal of contaminants from a fluid feed stream. In particular, the invention relates to the removal of an immiscible entrained fluid from a fluid feed stream and further to the removal of vapor and solid impurities from a fluid feed stream.

There are numerous applications where a fluid stream contains entrained and/or vaporized impurities. A common example involves compressors, where the compressor's lubricating oil vaporizes into the gas stream being compressed and the gas stream entrains droplets of the lubricating oil. The entrained and vaporized lubricating oil is an impurity or contaminant in the gas stream which frequently must be removed before further use of the gas stream. In another example, a first fluid may have a second fluid entrained and a third fluid dissolved within it. The first, second, and third fluids could be either liquids or gases.

Entrainment occurs when the carrying force of the fluid exceeds the gravitational force exerted on an entrained droplet. Mists and larger droplets can be carried along in a gas stream having sufficient velocity while fog-sized particles are small enough to be held in suspension within a gas stream having zero velocity. Entrainment begins to occur at an entrainment velocity that is particular to the fluids and conditions under consideration. Various devices have been used to remove entrained droplets from a fluid stream. Generally, such devices rely on impaction to agglomerate small droplets into larger droplets that are removed by gravity settling. Impaction is typically accomplished by providing a surface in the flow stream that changes the flow direction of the carrier fluid. The momentum of the entrained droplets causes them to collide with the surface. As additional droplets collide with the surface and agglomerate or coalesce, they form larger droplets that resist the carrying force of the flowing fluid. The coalesced droplets can then be removed by gravity separation.

Devices that remove entrained droplets as described above are referred to as coalescers and there are numerous designs for coalescers. One type of coalescer uses a porous media through which a mixture of a fluid and an entrained fluid are passed.

The coalescer of interest here is a hollow porous tube. Fluid is introduced into the central hollow portion and flows radially outward through the pores in the porous tube. The porous tubes are typically constructed of a fiberglass material. Entrained droplets are impacted and coalesced on the fibers and the coalesced droplets drain away by gravity action.

However, re-entrainment can occur if the velocity of the carrier fluid exceeds the entrainment velocity of the coalesced droplets. In a coalescer using hollow porous tubes, the tubes are generally arranged in concentric circles, concentric half-circles or in multiple longitudinal rows within a cylindrical shell. Fluid containing an entrained fluid is introduced via a manifold to the interior of the tubes. The fluid flows longitudinally within the tubes and radially out of the tubes through the porous walls of the tubes. Having passed through the walls of the porous tubes, the fluid flows toward an outlet to exit the shell. Fluid flows out of the tubes farthest from the outlet, combines with fluid flowing out of tubes nearer the outlet, and flows through the interstitial area within the shell and outside the tubes. Re-entrainment can occur if the fluid velocity exceeds the entrainment velocity at any point within the interstitial area.

Thus, the size, arrangement, and configuration of the tubes and shell are all factors that affect the velocity of the fluid at the many points within the interstitial area or volume defined by the inside walls of the shell and the outside walls of the tubes contained within the shell. Factors that determine entrainment velocity include the density, pressure and temperature of the carrying fluid and the viscosity, density and surface tension of the entrained fluid. Although they have been on the market for a long time, on information and belief, re-entrainment continues to be a problem in all such known coalescers because localized velocities within the interstitial area can exceed the entrainment velocity of coalesced droplets.

Vapor contaminants are often associated with entrained liquid contaminants. Although there are many ways of removing various vapors, such as scrubbing, the method of interest here is adsorption. Various adsorbents are available for removal of contaminants and proper selection is essential for a particular application. Available adsorbents include silica gel, silica-base beads, activated bauxite and alumina, molecular sieves, and activated carbon. Activated carbon is particularly effective in removing hydrocarbon vapors while silica gel is particularly effective for removing water vapor. Adsorbents can be used to adsorb and remove a contaminant from a fluid stream and the contaminant and the fluid stream can be gas, vapor or liquid. Most adsorbents are characterized by their highly porous structure, which provides a great deal of surface area for adsorption. Another factor in the effectiveness of removal of a contaminant by adsorption onto activated carbon, for example, is the size of the contaminant molecule to be removed. The more closely matched the size of the contaminant molecule is with the pore size of the adsorbent, the better is the removal of the contaminant molecule.

Contaminants are adsorbed onto the surface of the adsorbent, but the surface pores eventually become full with contaminant molecules. With many absorbents, the adsorption process can be reversed; for instance, activated carbon can be regenerated or reactivated. However, small quantities of activated carbon are more cost effectively disposed of and replaced with new material. Thus, access must be provided to a vessel containing the absorbent so that the absorbent can be replaced or regenerated.

One of the greater obstacles to the use of an adsorbent such as activated carbon is the equipment, facility, and installation cost. Particularly for small installations, the cost for an adsorption system can be prohibitive. There has been a need for system improvements that reduce both the installation and the operation cost of adsorption systems.

Further, an adsorbent can itself become a contaminant in a system. Adsorbents are typically solids having unusually high surface areas due to a porous structure. Handling of adsorbents and fluid flow through adsorbents causes some physical breakage of the adsorbent. Thus, the adsorbent provides a source of particulate contaminant, sometimes called fines, that must be removed from the process stream.

Generally, a filtration system is employed to remove particulate contaminants whether from adsorbent fines or from another source. The type of filtration or dust collection system depends on the quantity of particulate matter to be removed from a process stream. Where there is a great deal of particulate matter to be removed, equipment such as cyclone and impingement separators can be used. Other high volume applications include use of equipment such as baghouses, particulate scrubbers, and electrical precipitators. However, the volume of particulate in a stream exiting an adsorbent material is generally relatively low.

In gas applications, dry filters, in which a dry media such as paper is employed, are used to remove particulate matter. A filter should introduce little pressure drop to a system; thus, large surface areas are employed to minimize pressure drop across the filter material. The surface area through which a gas and particulate stream passes is increased by providing a pleated or folded surface. In this manner, the cross-sectional area through which a process stream passes is increased while the equipment size required for the filter system is reduced. Equipment, facility and installation costs, as well as operating costs, have been a concern. Any improvement that reduces costs and/or improves particulate removal efficiency is always welcomed. It is therefore an object of the present invention to provide an apparatus and method for removing entrained, vaporized (or gaseous), and/or particulate contaminants from a stream. In more detail, the present invention provides an apparatus and method for cost effectively removing contaminants composed of entrained fluids (or possibly solids), vapors (possibly from the entrained fluid), and particulate impurities (possibly introduced by the contaminant-removal system itself) from a fluid stream. Another object of the present invention is to provide a treatment system that is a single system that removes a variety of contaminants or impurities from a material to yield a desired purity.

It is another object of the present invention to provide a multi-function separator in which equipment cost is low but which achieves the desired material composition in the fluid stream. Still another object of the present invention is to provide an apparatus which is compact for use in applications in which physical space is given a high value. Another object of the present invention is to provide an apparatus and method in which the flow of the fluid stream is managed so as to make effective use of the installed equipment by preventing flow at rates which exceed entrainment velocity. Other objects will be apparent to those skilled in the art from the following description of a presently preferred embodiment of an apparatus constructed in accordance with the present invention.

SUMMARY OF THE INVENTION

These, and the many other, objects of the present invention are achieved by providing a multi-function separator comprising a coalescing section for removal of entrained liquid impurities in a process stream, an adsorbent section for removal of vapor contaminants, and a filter section for removal of particulate contaminants. A process stream is cleaned of contaminants by introduction into the longitudinal hollow centers of porous coalescer tubes in the coalescing section, where the process stream flows radially outwardly through porous tube walls and then through holes in a flow-control baffle into an adsorbent section, through a redistribution baffle into filters in the filter section, and out through another redistribution baffle. Managed flow through the multi-function separator and within the sections is accomplished by the sizing and location of holes in the flow-control baffles between the sections. Management, or control, of the fluid flow through the coalescing and adsorption sections can be accomplished with one such flow-control baffle, but three such baffles as described above are preferred.

In another aspect, the present invention achieves these many objects by providing a vessel for removing contaminants from a fluid. The vessel comprises a shell having an inlet and an outlet, a coalescing section manifolded to the inlet, a drain for the coalescing section; an adsorbent section proximate to the coalescing section and in communication with the outlet, and a first baffle between the coalescing and adsorbent sections for managing flow. The coalescing section preferably comprises hollow, porous tubes. Preferably, the first baffle is an elongate plate having holes arranged in rows parallel to the longitudinal axis of the first baffle, the holes varying in size from smallest holes nearest to the outlet to largest holes farthest from the outlet.

It is preferred that the vessel operate at a fluid velocity which is specific for the design conditions, wherein: the shell has an inside surface and the tubes have outside surfaces; an interstitial volume is defined for the coalescing section by the inside surface of the shell, the first baffle, and outside surface of the tubes; the fluid flows through the inlet, into the hollow, porous tubes, exits the tubes radially, and flows transversely to the length, or longitudinal axis of the tubes, through the interstitial volume, and toward the first baffle. The fluid passing through the interstitial volume has a fluid velocity which is calculated at a point within the interstitial volume by (1) determining the interstitial area of a plane that is parallel to the first baffle and passes through the point, (2) determining the flowrate of the fluid through the interstitial area of the plane, and (3) dividing the flowrate by the interstitial area of the plane to yield the fluid velocity. Once calculated in this manner, the tubes are sized and configured so that the fluid velocity is relatively equal at all points or any plane parallel to the first baffle within the interstitial volume and is controlled in this manner to be below the entrainment velocity of an entrained liquid contaminant in a carrier fluid.

The vessel further comprises a filter section between the adsorbent section and the outlet. A second baffle is preferably interposed between the filter section and the outlet for managing flow and is comprised of a tube having a plurality of holes in the walls thereof. Preferably a filter in the filter section is a hollow tube that fits over the second baffle. A third baffle is located within the adsorbent section for managing flow. Depending on the configuration chosen for the shell, the first, second, and third baffles are elongate, and the first, second, and third baffles are arranged parallel to the longitudinal axis of the shell. Preferably, the third baffle is an elongate plate having holes arranged in rows parallel to the longitudinal axis of the third baffle, the holes varying in size from smallest holes nearest to the outlet to largest holes farthest from the outlet so as to more effectively manage the flow therethrough.

The adsorbent can be activated carbon or any other adsorbent in common use. In one particularly preferred embodiment, the hollow, porous tubes of the coalescing section are comprised of fiberglass and the filter element in the filter section comprises a pleated paper filter element having a pore size of less than 1000 microns.

In another aspect the invention provides a multi-function separator having a coalescer section, an adsorbent section, and a filter section, with a first fluid distribution baffle between the coalescing section and the adsorbent section and a second fluid distribution baffle between the filter section and an outlet. The filter section preferably comprises a tubular filter placed over a perforated tube, wherein the tubular filter is surrounded by adsorbent, and the gas stream flows radially inwardly through the tubular filter into the perforated tube and out through the outlet. The longitudinal axis of the first distribution baffle is parallel to the longitudinal axis of the coalescing tubes and the direction of fluid flow from the coalescing tubes to the first distribution baffle is transverse to the longitudinal axis of the tubes. The flow from the coalescing tubes to the first distribution baffle has a velocity, wherein the coalescing section, the first distribution baffle, and the tubes are designed to yield a velocity below the re-entrainment velocity, for design conditions, so that the flow velocity through a plane within an interstitial area in the coalescing section and parallel to the first distribution baffle is relatively equal at all points in the plane and less than a predetermined re-entrainment velocity. Preferably, the coalescing section, the first distribution baffle, and the size of the intertices between the tubes and between the tubes and the walls are designed to yield a velocity for the design conditions that is less than the entrainment velocity for an entrained liquid contaminant in a gas stream. Those skilled in the art will recognize from this disclosure that the determination of the entrainment velocity requires a unique calculation for each application.

In yet another aspect, the invention provides a method of cleaning a fluid containing contaminants. The method comprises the steps of introducing the fluid stream into hollow, porous coalescing tubes, coalescing an entrained liquid contaminant and removing the liquid contaminant from the fluid by passing the fluid longitudinally through and radially out of the coalescing tubes, distributing the fluid to achieve an even, constant flow, at design conditions, between the coalescing tubes and a distributor, and adsorbing a vapor contaminant onto an adsorbent material. The invention can further comprise the steps of filtering a particulate contaminant out of the fluid and distributing the fluid through filters.

DETAILED DESCRIPTION OF THE INVENTION

The following detailed description of the invention pertains to a single application of the invention, but those skilled in the art will recognize that this application is merely illustrative and that the invention is useful in a variety of applications. In the embodiment described herein, a multi-function separator is used to remove entrained compressor cylinder lubricating oil and its vapor from hydrogen gas. As an example of this application of the invention, consider a catalytic process using pressurized hydrogen. A compressor pressurizes the hydrogen, but in doing so, lubricating oil becomes entrained in the hydrogen stream. In turn, the lubricating oil becomes partially vaporized so that both liquid and vaporized lubricating oil are present in the hydrogen stream. The presence of lubricating oil in this stream may be inconsequential, but in some applications, lubricating oil is a poison to a downstream catalyst and must be removed. Thus, a purification system is provided that removes both the entrained liquid and the vapor emitted from the entrained liquid lubricating oil.

Figure 1:
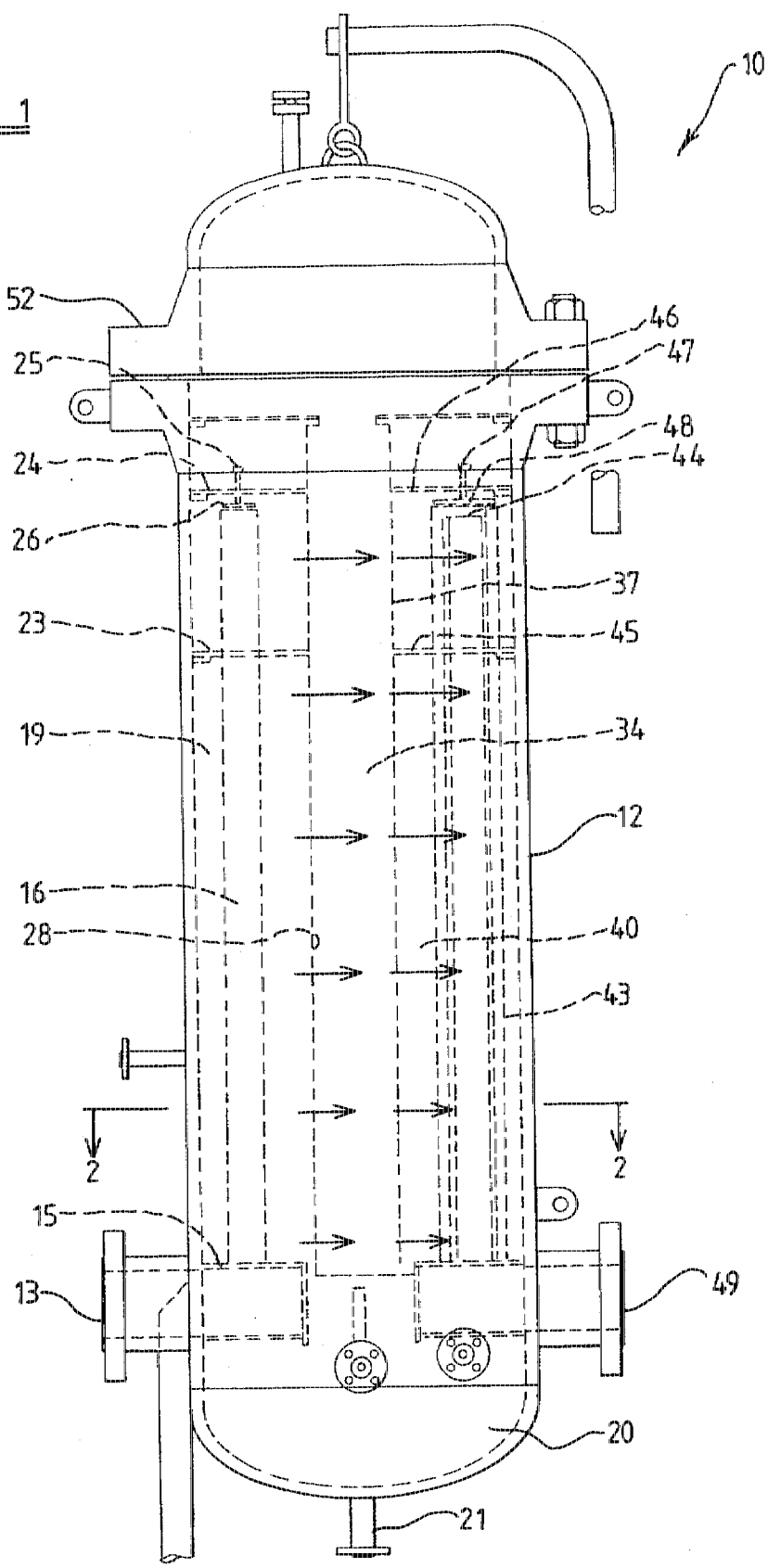
FIG. 1 is a longitudinal partial sectional view of a preferred embodiment of the multi-function separator constructed in accordance with the teachings of the present invention.
Figures 2, 3:
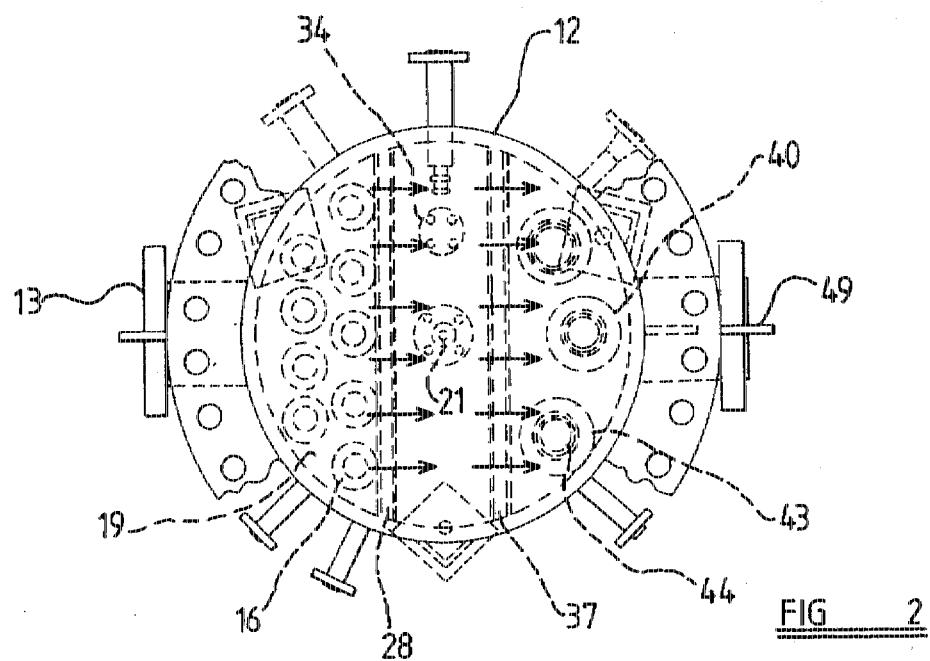
FIG. 2 is a schematic, cross-sectional view of the multi-function separator of FIG. 1 as seen along the lines 2—2.
FIG. 3 is a top plan view of the distribution baffle interposed between the coalescer section and the adsorbent section of the multi-function separator of FIG. 1.

Such an example of an application of the invention is shown in FIGS. 1 and 2. With reference to FIG. 1, a multi-function separator 10 has a shell 12 with an inlet 13. The inlet 13 has an inlet manifold 15 which is manifolded to hollow, porous fiberglass tubes 16 and comprises a coalescing section 19. A fluid containing an entrained fluid, or in this example, hydrogen containing entrained lubricating oil as a mist or fog, flows into the multi-function separator 10 through the inlet 13 and into the interior, hollow portion of the porous tubes 16. Entrained liquid or fluid is coalesced by impaction and agglomeration of the entrained material on the fibers or surfaces of the porous walls of the tube (and on collision and aggregation with coalesced droplets) as the process stream exits radially from the tubes 16.

The coalescer tubes 16 are hollow, elongate cylinders and fluid flows longitudinally through the hollow center. The walls of the tubes 16 are porous so that the fluid exits the tubes radially in a 360-degree pattern transverse to the longitudinal axis of the tubes 16 through fine fiberglass fibers. Those skilled in the art will recognize from this description of the preferred embodiment that other fibers may also be appropriate for use in the coalescing section of the separator of the present invention depending on the particular application including, for instance, rayon, silk, cotton, carbon, nylon, polypropylene, acrylic, and other commercially available fibers. The porous walls of the coalescer tubes 16 provide the surfaces on which the entrained fluid is coalesced, meaning that small fine droplets of entrained fluid that were carried along in the (carrier) fluid are combined to form larger droplets that cannot be carried along by the carrier fluid. The coalesced droplets migrate to the outside of the tubes 16 and drain by gravity toward a reservoir 20 where the coalesced fluid is removed via a drain 21. The multi-function separator 10 can be mounted in either a vertical position, as shown in FIG. 1, or m a horizontal position. However a vertical position is preferred for reasons associated with the adsorbent section.

The inlet manifold 15 is provided with openings around which short nipples (not shown; approximately 1–2 inches long) are stubbed toward the coalescer tubes 16. A hollow end of a coalescer tube 16 slips over a stubbed nipple of the inlet manifold 15. The coalescer tubes 16 are aligned by an alignment baffle 23 having holes through which the coalescer tubes 16 fit. The alignment baffle 23 holds the coalescer tubes 16 in a predetermined orientation, which aligns with the openings in the inlet manifold 15. The coalescer tubes 16 are inserted through holes in the alignment baffle 23 and over the stubbed nipples of the inlet manifold 15, and held down by a holddown plate 24 which is bolted into place after the coalescer tubes 16 are installed. A holddown bolt 25 is threaded through a hole in the holddown plate 24, fitted with a freewheeling holddown disk 26, and tightened against an end of a coalescer tube 16 to hold the coalescer robes 16 in place, sealing the ends of the coalescer tubes 16 against the inlet manifold 15 and the holddown disk 26.

After entrained fluid has been removed from the process fluid by the porous tubes 16 in the coalescing section 19, the process fluid or carrier fluid flows in a direction transverse to the longitude of the coalescer tubes 16. The carrier fluid passes around the outside of any coalescer tubes 16 closer to a flow distribution control baffle 28 through which the carder fluid passes as it passes through the multi-function separator vessel 10. The coalescer tubes 16 are arranged within the shell 12 so that the carrier or process fluid passes around the tubes 16 and within the interstitial volume at a relatively constant, predetermined velocity. The predetermined velocity is a design velocity intended to be lower than the re-entrainment velocity calculated for that particular application so that the coalesced fluid is not re-entrained by the carrier fluid flowing at a velocity higher than the re-entrainment velocity. Velocity is controlled at a rate lower than re-entrainment velocity by sizing the spaces between the coalescer tubes 16 so as to prevent any restriction in the flow of the fluid therebetween.

As best seen in FIG. 3, the distribution baffle 28 comprises a plate 29 which is provided with a plurality of holes 31 through which the fluid stream passes. The holes 31 in plate 29 are arranged and sized so that distribution baffle 28 slightly restricts the flow of the fluid stream therethrough so that the process stream passes through the holes 31 along the full length of the plate 29 and porous tubes 16, thus preventing channeling that would reduce the effectiveness of the coalescer section 19. The flow control provide by distribution baffle 28 serves two purposes within the coalescer section 19. First, the flow control baffle 28 forces the full use of the surface area of the porous tubes 16, thus maximizing the volume of coalescer material utilized for coalescing the entrained fluid. Second, the flow control baffle 28 forces a relatively constant velocity of the carrier gas or any plane parallel to the flow control baffle 28 within the interstitial volume of the coalescer (the volume outside the tubes 16 but within the coalescer section 19).

The holes 31 are arranged and sized so that the smallest holes are nearest the outlet 49 (not shown in FIG. 3 but described below), while the largest holes are farthest from the outlet. In the particularly preferred embodiment shown in FIG. 3, the holes 31 are arranged in rows and each hole 31 in a row is a different size. However, mechanical and practical constraints require several holes 31 to be the same size before a change to a group of holes 31 having a different size. Flow distribution is maintained by varying the spacing between holes of the same size so as to achieve the effect of holes of decreasing size. Thus, the holes in a row of holes increase in size in stair-step fashion from a group of smallest holes nearest the outlet to a group of largest holes farthest from the outlet.

With reference to FIG. 2, the process stream flows through the distribution baffle 28 into an adsorbent section 34. In the particular embodiment illustrated, it is envisioned that activated carbon is the adsorbent used to remove the vapors of the lubricating oil. However, those skilled in the art who have the benefit of this disclosure will recognize that other adsorbents are likewise used to advantage, selection of the particular absorbent depending upon the specific application and being within the skill of those familiar with the art. The distribution baffle 28 serves an additional purpose in that it distributes the fluid flow throughout the activated carbon section 34 so that the activated carbon is used effectively. The activated carbon in the adsorbent section 34 is pelletized for this application and further separated from the coalescing section 19 by a suitable mesh material (not shown).

The hydrogen gas (carrier fluid) flows through the activated carbon section 34, where any hydrocarbon vapors, such as lubricating oil vapor, are adsorbed onto the surface of the activated carbon. As best seen in FIG. 2, redistribution baffle 37 prevents channeling. Similar in design to the distribution baffle 28 shown in FIG. 3, the holes (not shown) in redistribution baffle 37 are arranged in a pattern similar to the pattern of holes 31 in the distribution battle 28. The smallest holes are nearest the outlet 49, while the largest holes are farthest from outlet 49. Also in the same manner as the holes 31 in distribution baffle 28, the total cross-sectional area of the holes in redistribution baffle 37 is less than the area needed to allow unrestricted flow through redistribution baffle 37 so as to provide a slight resistance to flow, causing fluid to flow through the holes all along the length of redistribution baffle 37, and thus increasing the likelihood that the fluid comes in contact with all of the activated carbon. This arrangement of the holes and restriction of the flow through the battles 28 and 37 prevents channeling and promotes effective adsorption of gaseous contaminants by the activated carbon or other absorbent.

Activated carbon is positioned adjacent to both the inlet side and the outlet side of the redistribution baffle 37 because the redistribution baffle 37 redistributes the fluid flow within the adsorbent section 34. The activated carbon is dry and subject to some breakage, creating a dust or particulate impurity/contaminant that, in this application, must be removed.

A filter section 40, comprising tubular filters 43 over a tubular second redistribution baffle 44, is provided for removing the particulate impurities from the fluid stream, whether fines from the activated carbon or another source. As best seen in FIG. 2, the tubular filters 43 are surrounded by the activated carbon. Hydrogen (or the fluid being cleaned) passes through the activated carbon section 34 and into the tubular filters 43. Carbon fines or other particulate contaminants can be carded along by the hydrogen stream.

The tubular filters 43 remove these solid, particulate contaminants from the fluid stream. In the preferred embodiment shown in the figures, the filter 43 is formed in the shape of a hollow tube comprised of folded or pleated paper as a filter material. The filter material should be selected to satisfy the requirements of the application. A perforated plastic sheeting (not shown), such as Teflon®, preferably encloses the outer portion of a pleated paper filter 43. The process fluid being cleaned, hydrogen in this example, passes through the activated carbon and into the outer surface of the filter 43, through the filter material, and into the center, hollow portion of the tubular filter 43.

As best seen in FIG. 2, each of the tubular filters 43 comprising the filter section 40 fits over a respective perforated tube, the several perforated tubes together comprising a second redistribution baffle 44. Fluid passes through the outer surface of the tubular filter 43, into the hollow center of the tubular filter 43, and through the perforations (not shown) in the tubes comprising second redistribution baffle 44. Similar to the coalescer tubes 16, the filters 43 are aligned by a filter alignment baffle 45 and held in place by a filter holddown plate 46, filter holddown bolt 47, and a filter holddown disk 48.

Each of the perforated tubes comprising the second redistribution baffle 44 is preferrably octagonally-shaped in transverse cross-section, but pipes having a circular cross-section also provide acceptable performance. The perforations in the second redistribution baffle 44 are sized and arranged to provide effective use of the filter material. Like the holes in the distribution baffle 28 shown in FIG. 3, the perforations in the second redistribution baffle 44 are different sizes, the smallest being located nearest the outlet 49 and the largest being located farthest from the outlet. If robes having an octagonally-shaped cross section are used as the redistribution baffle 44, the perforations in those robes are preferably located on the flat sides of each of the tubes comprising the second redistribution baffle 44. Like the holes in distribution baffle 28, the perforations in second redistribution baffle 44 prevent channeling through the filters 43, thus providing effective use of the activated carbon 34 and the filter material.

The several tubes comprising second redistribution baffle 44 are manifolded to outlet 49 as best seen in FIG. 1. Thus, the hydrogen (or other process fluid being purified) passes through the filters 43, through the second redistribution baffle 44, and out of the multi-function separator 10 through the outlet 49.

The present invention is used in a variety of applications for removing contaminants and impurities from a stream comprising a fluid and an entrained fluid (particulate matter can be included). The fluid and/or entrained fluid can be gas, liquid or a fluidized solid. The fluid stream is introduced into separator 10 through an inlet 13, as best seen in FIG. 1. The fluid and entrained fluid enter the coalescing section 19 by flowing into the interior of the hollow porous tubes 16 and flow longitudinally through the center of the porous tubes 16.

The fluid and entrained fluid pass radially through the porous walls of the tubes 16. However, the entrained fluid is coalesced as it passes through the porous walls; small, fine droplets carried by the fluid are impacted on surfaces, agglomerated into larger droplets that are not readily entrained, and are drained away from the fluid. Thus, the porous walls of the tubes 16 provide the coalescing action required for the coalescing section 19 to remove the entrained fluid. The formerly entrained fluid, now coalesced into non-entrained droplets, is removed from the multi-function separator 10 through the drain 21. The porous tubes 16 comprising coalescing section 19 are sized and arranged, e.g., spaced apart from each other and from the side walls of the shell 12, in the coalescing section 19 in a properly sized vessel or shell so that the coalesced droplets are not re-entrained. This sizing and arranging controls, or manages, the fluid velocity throughout the interstitial volume within the coalescing section 19, but outside the tubes 16, at a lower velocity than the re-entrainment velocity of the coalesced droplets.

As best seen in FIG. 3, the holes 31 in the distribution baffle 28 are sized and arranged so that, in addition to having the carrier fluid and entrained fluid utilize the full length of the porous robes 16 in the coalescing section 19, the holes 31 force an even, transverse flow of the carrier fluid within the interstitial volume which may be referred to as "plug flow." The carrier fluid flow is substantially perpendicular to the length of the porous tubes 16 after passing radially through the holes in the walls of the robes 16 comprising the coalescing section 19. Thus, the full length of the coalescer section 19 is used to accommodate the carrier fluid flow, which minimizes the carrier fluid velocity and minimizes the possibility of re-entraining coalesced droplets off the outside tube walls. A flow control baffle (28 or 37) is used to manage flow within the vessel so that the carrier fluid flows within the coalescer interstitial volume at a nearly constant velocity below the re-entrainment velocity of the entrained fluid. Of the three flow control baffles (28, 37 and 44), the one most essential is the second redistribution baffle 44. The function of flow-control baffle 28 can be served by either of redistribution baffles 37 or 44.

The process fluid, freed of entrained fluid, flows from the coalescing section 19 to the activated carbon section 34 through the holes 31 in the distribution baffle 28. Thus, this method of cleaning impurities from a fluid includes removal by adsorption. As noted above, although activated carbon is the adsorbent in the preferred embodiment described herein, various other adsorbents such as silica gel, silica-base beads, activated bauxite and alumina, and molecular sieves are available for removal of contaminants. Selection of an adsorbent for a particular application is essential. In the case of hydrogen gas being cleaned of lubricating oil, the liquid oil is coalesced and drained 21 in the coalescing section 19, and the vapor (a hydrocarbon) from the lubricating oil is adsorbed onto the porous surface of the activated carbon.

The holes 31 in the distribution baffle 28 are arranged to provide optimum utilization of the coalescing tubes 16 and the adsorbent in the adsorbent section 34, but primarily to maintain a low, constant velocity of the carrier fluid within the coalescer interstitial volume. The holes 31 are typically arranged in rows with the smallest hole 31 closest to the outlet 49 and the largest hole 31 at the greatest distance from the outlet 49. The open area of the holes 31 is sized at approximately 90 percent of the open cross-sectional area of the second redistribution baffle 44, where it is manifolded to the outlet 49. This sizing provides the slight flow restriction needed for good distribution through the coalescing tubes 16, adsorbent section :34, and dry filter section 40. The holes for the redistribution battle 37 and the second redistribution baffle 44 are sized based on the same principle, 90 percent of the outlet hole area. The area for a row of holes is first calculated as the area for an isosceles triangle having its apex pointing at the outlet 49. The diameters of the holes are then sized to provide approximately the same cross-sectional area as the cross-sectional area of the isosceles triangles. Within the adsorbent bed 34 is the first redistribution baffle 37 which provides good distribution of the process fluid within the adsorbent bed 34. The first redistribution baffle 37 preferably also uses a pattern of holes (not shown) similar to that described above for the distribution baffle 28 and its holes 31. In alternative embodiments, either or both of the distribution baffle 28 or the first redistribution baffle 37 can be eliminated, the remaining baffle providing flow control.

Because the fluid to be cleaned typically picks up fines or particulate matter from the adsorbent (activated carbon), the next step in this method is filtration. For dry hydrogen gas with some activated carbon fines, a dry filter section 40 is used. Although there are many suitable media available for use as a dry filter, for this application a commercially available pleated paper filter 43 having a 1 micron pore size is preferred. A Teflon® or suitable plastic or fiber sheet with holes, slits or other perforations covering the outer surface of the paper filter 43 helps to prevent the premature plugging of the filter dement 43.

In a preferred embodiment, the filters 43 are constructed in the shape of hollow elongate cylinders that fit onto a bayonet baffle which is the second redistribution baffle 44. In the preferred embodiment shown in which a filter dement having a 1 micron pore size is utilized, particles having diameters less than 1 micron pass, along with the clean, dry hydrogen, into the hollow center of the bayonet baffle 44. Particles having diameters greater than 1 micron are prevented from flowing out of the activated carbon section 34.

The fluid (hydrogen in the example described herein), having been treated to remove the entrained fluid (the liquid lubricating oil) in the coalescing section 19, the vapor (from the liquid lubricating oil) by adsorption in the activated carbon section 34, and the particulate matter (fines from the activated carbon) by the filters 43 in the filter section 40, flows out of the multi-function separator 10 through the outlet 49. The multi-function separator 10 is considered multi-functional because in a single vessel, the functions of coalescing, adsorption and filtration are all accomplished, thus removing liquid, vapor and solid impurities.

The ongoing use of the multi-function separator 10 requires that the adsorption bed 34 and the filters 43 be removed and flesh ones installed. A removable bonnet 51 provides access to the internal elements of the multi-function separator 10. Thus, with the bonnet 51 in the open position, the porous tubes 16, the activated carbon 34, and the dry filters 43 can all be removed and new and/or flesh (or regenerated) ones installed in their stead. In the embodiment described, the activated carbon is vacuumed out. Alternatively, a drain outlet can be installed in the vessel for draining the activated carbon, which flows like a fluid.

In designing an apparatus in accordance with the present invention, one first needs to consider the application for which it is intended because it is preferred that the apparatus of the present invention be custom designed for each application. A number of parameters should be known, including the composition of the stream to be cleaned and its flowrate, specific gravity, viscosity, pressure and temperature and any other characteristics pertinent to an entrainment calculation. The contaminants or impurities in the process stream, their concentration, and the extent to which the impurities must be removed also need to be known. The properties and physical characteristics of the contaminants should be known, including surface tension, viscosity, and specific gravity, because an entrainment velocity calculation which is unique to the operating conditions and components of the system must be made. With this information, one skilled in the art can calculate an entrainment velocity for the entrained contaminant in the fluid.

One skilled in the art should select the coalescer element based on the properties of the entrained fluid as they pertain to the propensity of the entrained fluid to coalesce. Hollow, porous coalescing tubes are commercially available. Properly formed, wrapped or molded boron silicate fiberglass elements also provide satisfactory results (depending upon the factors listed above) and boron silicate, vacuum-formed east glass elements are also commercially available.

The coalescer 19 is sized once appropriate coalescer tubes 16 are selected, the size of the shell 12 and coalescing tubes 16 being selected so as to handle the flowrate of the process stream. Typically, an iterative process is used to determine the number, size, configuration and layout (e.g., spacing between tubes 16 and spacing between tubes 16 and the inside wall of the shell 12) of the coalescing tubes 16, the size of the shell 12, and location of the baffle 28. Preferably, the velocity of the process fluid in the interstitial volume in the coalescer 19 (the volume within the coalescer 19, but outside of the tubes 16) is relatively constant throughout the interstitial volume and less than the entrainment velocity so as to prevent re-entrainment of droplets that have been coalesced in the coalescer 19.

Proper function of the coalescer section 19 requires proper calculation of the entrainment velocity for the entrained fluid in the carrier fluid. Factors affecting entrainment velocity include the density, pressure, temperature, viscosity, and surface tension of the fluids. Entrainment velocity is unique to each system because its value depends on many factors. For identical fluids and contaminants, entrainment velocity varies considerably with pressure or temperature. The surface tension of an entrained contaminant is a significant variable in an entrainment calculation, and surface tension is a sensitive function of pressure and temperature. Further, other fluids (particularly gases) can affect surface tension. Guidance for calculation of entrainment velocities is set out in a number of standard references, see, for instance, *Perry's Chemical Engineers' Handbook* (Robert H. Perry and Don W. Green, Eds., 6th Ed., 1984, McGraw-Hill Book Co.).

The velocity of the carrier fluid within the interstitial volume of the coalescer section 19 is preferably relatively constant and less than the entrainment velocity of the entrained fluid. Thus, the coalescer tubes 16 and the inside diameter of the shell 12 of the coalescer 19 are sized and arranged so that the carrier fluid is maintained at a relatively constant velocity within the interstitial area. As best seen in FIG. 2, carrier fluid flowing out of the porous walls of the row of tubes 16 farthest from the outlet 49 flows toward the outlet 49, first passing through the distribution baffle 28, which is perforated with different sizes of holes 31 in rows with the smallest holes nearest the outlet 49 and the largest holes farthest from the outlet 49. As the carrier fluid flowing out of the holes 31 in the row farthest (from the outlet 49) approaches the nearer row, it combines with the carrier fluid flowing out of the farther side of the nearer row. This combined carrier fluid passes between the tubes of the nearer row or between the outer tubes and the inside walls of the shell 12. The velocity of the fluid passing between the tubes should be low enough to prevent re-entrainment of the coalesced droplets, which are on the outer surfaces of the tubes 16. Velocity is calculated by formulas known in the art, e.g., by dividing a volumetric flowrate (such as cubic feet per minute) by an area (square feet) to yield a calculated velocity (feet per minute).

If appropriate for the application, the adsorbent section 34 is then sized. If the fluid to be treated includes a contaminant removable by an adsorbent, then an adsorbent section 34 should be included. The size of the adsorbent section is determined based on the loading anticipated for it, with consideration for the frequency at which the adsorbent must be replaced (assuming no in-sire regeneration capability).

If the fluid to be treated includes a solid impurity or if the adsorbent introduces a solid contaminant into the process stream, then a filter section 40 should be included in the design. The size and nature of the solid particles to be removed determines the material and pore size for the filter. The filter described in the application above was tubular in shape; however, the shape and configuration can be different depending upon the application. Factors in the design considerations include the particle size, particle loading (i.e. the quantity to be removed), tendency of the particles to dog a filter, flowrate of the process fluid, pressure drop, and temperature. With such knowledge, one skilled in this art can generally specify a commercially available filter for use in the filter section 40.

The flow through a multi-function separator 10 must be managed for proper operation. In addition to the proper sizing of the shell 12, inlet 13, outlet 49, coalescer robes 16 and the arrangement of the coalescer robes 16, the flow control distribution baffles are designed to maintain plug flow throughout each section of the multi-function separator 10. The proper sizing and placement of the holes in these flow control baffles provides managed flow through the multi-function separator 10. The distribution baffle 28 serves several purposes. First, it provides a backpressure against the coalescer section 19 so that the process fluid uses the full longitudinal length of the porous tubes 16, thus making full use of the porous walls of the tubes 16. Secondly, the distribution baffle 28 distributes the process stream evenly into the entire adsorbent section 34, so that the adsorbent is used effectively. Thirdly, it distributes the carrier fluid along the entire longitude of the coalescer section 34 so that the carrier fluid flows transversely to the longitude of the coalescer tubes 16 and at a relatively constant, design velocity. The first redistribution baffle 37 redistributes the process stream within the adsorbent section 34 so that the full width and depth of the adsorbent is utilized. The first redistribution baffle 37 prevents channeling through the adsorbent into the filters 43. The second redistribution baffles 44 prevent channeling through the filters 43. The entire cross-section of a filter 43 is used because the process fluid must pass through the filter element to exit through holes in the second redistribution baffle 44.

A complete design includes other considerations such as: material of construction, pressure rating, access to the coalescing 19, adsorbent 34, and filter 43 sections for maintenance, drain 21 location, instrumentation, and vessel orientation. From a process design and process parameters, a mechanical design can be determined.

The benefits of the present invention are numerous and include operability, economic and space-saving benefits. Operability benefits include effective removal of the entrained fluid and preventing bypass of the coalescer elements by proper fitting of the coalescer tubes 16 at the inlet manifold end and at the opposing end. Re-entrainment of coalesced fluid is prevented because the carrier fluid flows transverse to the longitude of the coalescer elements 16 at a velocity below the entrainment velocity for the coalesced fluid (provided that a unique entrainment velocity is calculated properly for each application). So far as is known, coalescers which are presently commercially available are constructed so that the carrier gas flow is parallel to the coalescer tubes, in which case the carrier gas velocity, around the coalescer tubes and near the outlet, exceeds the re-entrainment velocity, causing the coalesced fluid to be swept out of the vessel. The baffle 28 design of the separator of the present invention prevents carryover of the coalesced fluid into the activated carbon section. Effective use is made of the activated carbon 34 and filter elements 43 by preventing channeling with the first redistribution baffle 37 and the second redistribution baffle 44.

Economic benefits of the separator of the present invention include a cost reduction in the manufacturing material in that two vessels and associated piping are eliminated. Separate vessels for the adsorbent section 34 and filter section 40 are not needed because the multi-function separator 10 provides these functions. Piping providing and possibly pumps between vessels are eliminated. Since only a single vessel is required, two additional foundations are eliminated, which further reduces installation cost.

Space-saving benefits accrue because a single multi-function separator requires much less ground space than does separate vessels for each function. A multi-function separator requires only a single foundation, rather than three foundations, which reduces the footprint requirement for the installation. Thus, the present invention may be installed in an existing plant that is congested with equipment. In a new plant, less real estate is consumed by the multi-function separator than by separate equipment.

The present invention is illustrated by way of the foregoing description and examples. The foregoing description is intended as a non-limiting illustration, since many variations will become apparent to those skilled in the art in view thereof. It is intended that all such variations within the scope and spirit of the appended claims be embraced thereby.

What is claimed is:

1. A method of cleaning a fluid stream containing contaminants comprising the steps of:
   introducing the fluid into hollow, porous coalescing tubes;
   coalescing an entrained liquid contaminant and removing the liquid contaminant from the fluid by passing the fluid longitudinally through and radially outwardly from the coalescing tubes;
   distributing the fluid to achieve a constant flow volume, along the length of the coalescing tubes; and
   adsorbing a vapor contaminant onto an adsorbent material.

2. The method of claim 1 further comprising the step of filtering a particulate contaminant out of the fluid.

3. The method of claim 1 additionally comprising maintaining relatively constant flow velocity along the length of the coalescing tubes.

4. A vessel for removing contaminants from a fluid stream comprising:

a shell having an inlet and an outlet;
a coalescing section manifolded to said inlet;
a drain for said coalescing section;
an adsorbent section proximate to said coalescing section and in fluid communication with said outlet; and
a distribution baffle interposed between said coalescing section and said outlet for managing the flow of the fluid stream therethrough.

5. The vessel of claim 4 wherein said coalescing section comprises hollow, porous tubes.

6. The vessel of claim 5 wherein said distribution baffle comprises an elongate plate having holes arranged in rows parallel to the longitudinal axis of the plate, the holes varying in size from smallest holes nearest to said outlet to largest holes farthest from said outlet.

7. The vessel of claim 6 wherein
   said shell has an inside surface and said tubes have outside surfaces defining, along with the outside surface of said tubes, an interstitial volume for said coalescing section into which the fluid stream flows toward said distribution baffle at fluid velocity, and
   the tubes are sized and arranged in the interstial volume so that the fluid velocity is relatively constant within the interstitial volume, the sizing and arrangement of the tubes in the interstitial volume being determined by calculating fluid velocity at a point within the interstitial volume by
   (1) determining the interstitial area of a plane that is parallel to said distribution baffle and passes through the point within the interstitial volume,
   (2) determining the flowrate of the fluid through the interstitial area of the plane, and
   (3) dividing the flowrate by the interstitial area of the plane to yield the fluid velocity.

8. The vessel of claim 5 wherein a contaminant in the fluid is an entrained liquid and said hollow porous tubes are arranged in said coalescing section so that the velocity of fluid flow is less than the entrainment velocity of the entrained liquid in the fluid.

9. The vessel of claim 8 further comprising a filter section interposed between said adsorbent section and said outlet.

10. The vessel of claim 9 further comprising a second baffle interposed between said filter section and said outlet for managing flow.

11. The vessel of claim 10 wherein said second baffle comprises a tube having a plurality of holes through the walls thereof wherein a filter comprising said filter section is constructed in the shape of a hollow tube fitting over said second baffle.

12. The vessel of claim 11 further comprising a third baffle located within said adsorbent section for managing flow, wherein said shell and said distribution, second, and third baffles are elongate and are arranged with respective longitudinal axes parallel to the longitudinal axis of said shell.

13. The vessel of claim 12 wherein said third baffle comprises an elongate plate having holes arranged in rows parallel to the longitudinal axis thereof, the holes varying in size from smallest holes nearest to said outlet to largest holes farthest from said outlet.

14. The vessel of claim 13 wherein the adsorbent in said adsorbent section comprises activated carbon.

15. The vessel of claim 14 wherein said tubes comprising said coalescing section are comprised of fiberglass.

16. The vessel of claim 15 wherein the filter in said filter section comprises a pleated paper filter element.

17. A multi-function separator for removing contaminants from a gas stream comprising:

a source gas stream;

an inlet in fluid communication with the source gas stream;

a coalescing section in fluid communication with the inlet;

a plurality of elongate porous tubes within the coalescing section for coalescing an entrained liquid contaminant in the source gas stream, wherein the source gas stream flows longitudinally into the porous robes and flows radially out of the porous tubes;

a drain to remove the coalesced entrained liquid;

an adsorbent section in fluid communication with the coalescing section for removing vapor from the gas stream;

a first elongate fluid distribution baffle located between the coalescing section and the adsorbent section, the first fluid distribution baffle having a plurality of holes spaced along the length thereof for evenly distributing flow into the adsorbent section;

a filter section in fluid communication with the adsorbent section for removing particulate contaminants from the gas stream;

an outlet in fluid communication with the filter section, wherein the filter section is between the adsorbent section and the outlet; and a second fluid distribution baffle located between the filter section and the outlet, the second fluid distribution baffle having a plurality of holes spaced along the length thereof for evenly distributing flow into the filter section.

18. The multi-function separator of claim 17 wherein the longitudinal axis of the first distribution baffle is parallel to the longitudinal axis of the tubes and the gas flow direction from the tubes to the first distribution baffle is transverse to the longitude of the tubes.

19. The vessel of claim 18 wherein the gas flow from the tubes to the first distribution baffle has a velocity, wherein the coalescing section, the first distribution baffle, and the tubes are designed to yield a single velocity, for design conditions, so that the gas flow through a plane within the coalescing section and parallel to the first distribution baffle is relatively equal at all points in the plane.

20. The vessel of claim 19 wherein the coalescing section, the first distribution baffle, and the tubes are designed to yield a velocity for the design conditions that is less than the entrainment velocity for the entrained liquid contaminant in the gas stream.

21. The vessel of claim 20 wherein the filter section comprises a tubular filter placed over a perforated tube, wherein the tubular filter is surrounded by adsorbent, and the gas stream flows radially inwardly through the tubular filter into the perforated tube and out through the outlet.

22. A multi-function separator comprising:

an elongate shell with an inlet and an outlet for connection in a gas stream;

first and second baffles arranged longitudinally in the elongate shell and having a plurality of holes therethrough for passing gas between first, second and third compartments inside said shell defined by said first and second baffles;

a coalescer in the first compartment in said shell for removing entrained liquid contaminants from the gas stream;

an adsorbent in the second compartment in said shell for removing vapor contaminants from the gas stream from which liquid contaminants have been removed; and a filter in the third compartment in said shell for removing particulates from the gas stream from which both liquid and vapor contaminants have been removed, the holes in said first and second baffles being arranged to allow plug flow of the gas stream between first, second, and third compartments.

23. An apparatus for removing contaminants from a fluid stream comprising: an inlet for the fluid stream; a coalescing section connected to said inlet comprising one or more porous elements and being provided with a drain; and an outlet for the fluid stream; there being an apertured baffle located between said coalescing section and said outlet, said baffle having a ratio of aperture area to baffle area which increases with increasing distance from said inlet.

24. An apparatus according to claim 23 wherein said coalescing section comprises a plurality of parallel, porous, hollow tubes manifolded to said inlet.

25. An apparatus according to claim 23 wherein said baffle is provided with a plurality of apertures of different sizes arranged and sized so that the smallest apertures are nearest the inlet and the largest apertures are furthest from the inlet.

26. An apparatus according to claim 23 wherein said baffle separates said coalescing section from a subsequent processing section.

27. An apparatus according to claim 26 wherein the subsequent processing section is an adsorbing section.

28. An apparatus according to claim 27 wherein said adsorbing section contains activated carbon.

29. An apparatus according to claim 27 wherein, between said adsorbing section and said outlet, a filtering section is provided.

30. An apparatus according to claim 29 wherein said filtering section comprises at least one apertured baffle associated with a filter element.

31. An apparatus according to claim 30 wherein the apertured baffle associated with the filter element has a ratio of aperture area to baffle area which increases with increasing distance from said outlet.

32. An apparatus according to claim 27 wherein a further baffle is associated with said adsorbing section.

33. An apparatus according to claim 32 wherein said further baffle has a ratio of aperture area to baffle area which increases with increasing distance from said inlet.

34. An apparatus according to claim 23 wherein said baffle is located adjacent said outlet.

35. An apparatus according to claim 23 wherein said inlet and said outlet comprise the inlet and outlet to a single shell, said coalescing section, said drain, and said baffle being within the shell.

* * * * *